US008847420B2

(12) United States Patent
Garrido García et al.

(10) Patent No.: US 8,847,420 B2
(45) Date of Patent: Sep. 30, 2014

(54) DEVICE FOR GENERATING ELECTRICAL ENERGY BY HARNESSING THE ENERGY OF WAVES

(76) Inventors: Diego Garrido García, Leon (ES); Carlos Santos Gutierrez, Leon (ES); Ruben Ferrero Castro, Ferral del Bernesga (ES)

(*) Notice: Subject to any disclaimer, the term of this patent is extended or adjusted under 35 U.S.C. 154(b) by 59 days.

(21) Appl. No.: 13/819,321

(22) PCT Filed: Aug. 3, 2011

(86) PCT No.: PCT/IB2011/053449
§ 371 (c)(1),
(2), (4) Date: May 24, 2013

(87) PCT Pub. No.: WO2012/025848
PCT Pub. Date: Mar. 1, 2012

(65) Prior Publication Data
US 2013/0234442 A1    Sep. 12, 2013

(30) Foreign Application Priority Data

Aug. 26, 2010   (ES) .................................. 201001106

(51) Int. Cl.
*F03B 13/20* (2006.01)
*F03B 13/12* (2006.01)
*F03B 13/24* (2006.01)

(52) U.S. Cl.
CPC ................. *F03B 13/12* (2013.01); *F03B 13/20* (2013.01); *Y02E 10/38* (2013.01); *F03B 13/24* (2013.01)
USPC ........................................................ 290/53

(58) Field of Classification Search
CPC ........................................................ F03B 13/20
USPC ............................................................. 290/53
See application file for complete search history.

(56) References Cited

U.S. PATENT DOCUMENTS

| 3,777,494 A | 12/1973 | Soderlund | |
|---|---|---|---|
| 4,232,230 A * | 11/1980 | Ames | 290/53 |
| 4,340,821 A * | 7/1982 | Slonim | 290/53 |
| 5,176,552 A | 1/1993 | Kuboyama et al. | |

(Continued)

FOREIGN PATENT DOCUMENTS

| GB | 1 262 261 | 2/1972 |
|---|---|---|
| GB | 1 530 318 | 10/1978 |

OTHER PUBLICATIONS

International Search Report and Written Opinion for PCT/IB2011/053449 mailed Dec. 19, 2011, 10 pgs.

*Primary Examiner* — Joseph Waks
(74) *Attorney, Agent, or Firm* — Merchant & Gould P.C.

(57) ABSTRACT

A device for generating electrical energy by harnessing the energy of waves includes an enveloping housing (1) divided into: a lower air chamber (23) containing a generator (14) and a high tonnage weight (12), suspended from an upper axle (10) mechanically connected to a lower axle (16); an intermediate chamber (24) that includes water inlets/outlets (22) and is open at the top by means of an air outlet (29); and an upper chamber (25) including a compressor (6), a turbine (4) and a generator (5). The compressor (6) is mechanically actuated by an electric motor or by mechanical transmission by a chain (7) connecting the upper axle (10) of the lower chamber (23) and the axle of the compressor (6), and generates pressurized air for removing the water from the intermediate chamber (24).

10 Claims, 2 Drawing Sheets

(56) References Cited

U.S. PATENT DOCUMENTS

| | | |
|---|---|---|
| 5,701,740 A | 12/1997 | Tveter |
| 7,076,949 B2 * | 7/2006 | Fernandez Gomez et al. .. 60/498 |
| 7,768,143 B2 * | 8/2010 | McCague et al. ............... 290/42 |
| 7,845,880 B2 * | 12/2010 | Rasmussen .................... 405/76 |
| 8,110,935 B2 * | 2/2012 | Shin ............................... 290/42 |
| 8,487,459 B2 * | 7/2013 | Eder et al. ...................... 290/42 |
| 2003/0137150 A1 | 7/2003 | Shu |
| 2009/0224548 A1 * | 9/2009 | Oigarden ........................ 290/53 |
| 2012/0126540 A1 * | 5/2012 | Healy ............................. 290/53 |
| 2013/0154267 A1 * | 6/2013 | Healy ............................. 290/53 |

* cited by examiner

DEVICE FOR GENERATING ELECTRICAL ENERGY BY HARNESSING THE ENERGY OF WAVES

This application is a National Stage Application of PCT/IB2011/053449, filed 3 Aug. 2011, which claims benefit of Serial No. 201001106, filed 26 Aug. 2010 in Spain and which application(s) are incorporated herein by reference. To the extent appropriate, a claim of priority is made to each of the above disclosed applications.

OBJECT OF THE INVENTION

The invention, as indicated in the wording of the present specification, relates to a device for generating electrical energy by harnessing the energy of waves.

More in particular, the object of the invention focuses on a system for harnessing marine energy, specifically, that of waves or wave power, and its subsequent transformation into electrical energy, which, unlike the current harnessing systems for said wave energy, enables a greater harnessing of energy and consequently, the aim sought, a greater energy production.

TECHNICAL FIELD OF THE INVENTION

The technical field of the present invention falls within the technical sector of the industry dedicated to the research, manufacturing and operation of alternative systems of electrical energy production, using renewable energy as a point of reference.

BACKGROUND OF THE INVENTION

As is it known, there are many modalities of systems for harnessing wave energy, although it remains unclear which are the most favourable for the harnessing of wave energy based on the following methodology:

Primary conversion. Consists in the extraction of energy from the waves by means of mechanical, pneumatic or hydraulic systems, converting the movement of the waves into the movement of a body or of a fluid.

Secondary conversion. Consists in the conversion of mechanical, pneumatic or hydraulic movements into renewable energy, generally electricity. The means used for this are pneumatic and hydraulic turbines, mechanical transmission devices and magnetic induction devices.

The techniques for the use of wave energy harness basic phenomena that are produced in the waves, and are:

Wave thrust. In less deep water the horizontal speed of the waves does not vary with depth; the kinetic energy of the waves can be absorbed by means of a barrier that transmits the energy to a piston.

Variation in the height of the surface of the wave. Placing floating structures that move with the waves, syntonised in a way so that they can capture its energy. A great number of the same are provided to capture the energy, since they are based on any process that can generate waves, they also serve to extract their energy. The majority of these equipments use a pumping effect which the float provides. These may be considered second generation equipment.

Variation in the pressure below the surface of the wave. They are oscillating water column systems; they consist in a chamber open to the sea, which encloses a volume of air that compresses and expands by the oscillation of the water induced by the wave, the air circulates through a turbine which may be bidirectional. These may be considered first generation equipment.

Therefore, while there are many systems for harnessing the wave energy, each one of these has a different system for the transformation of wave energy into electrical energy. However, the petitioners do not know any other system for harnessing wave energy that presents technical, structural and configuration characteristics similar to those presented which are hereby proposed.

DESCRIPTION OF THE INVENTION

The device for generating electrical energy by harnessing the energy of waves that the present invention proposes configures, therefore, a notable novelty within its technical field, the characterising details being what distinguish it from that already known, accordingly listed in the final claims which accompany the present specification thereof.

Specifically, the purpose of the device object of this invention is the obtaining of electrical energy from the energy contained in the undulatory movement of ocean water.

For this, the proposed device is configured from an enveloping housing configured as a float, preferably cylindrical, which is divided into at least two chambers, one air chamber and another with water inlets and outlets, preferably three, two air chambers, one lower and another upper, and an intermediate chamber with water inlets and outlets, and whose nature and functions are the following:

A lower chamber, which has a counterweight. It is an air chamber principally containing a generator and a high tonnage weight, suspended from an axle or pulley, or connected to it by means of some method of mechanical transmission. This upper axle is mechanically connected to a second axle located on the lower part of the chamber.

Part of this lower axle is maintained inside the chamber wherein the weight is located, defining an airlock, preventing any mechanism from inside the housing from being in contact with the water.

The other part of the axle exits towards the outside of the housing by means of gaskets or seals, maintaining the water-tightness of the system. In this central part, which is outside the chamber, there is a cable or chain collection mechanism. This cable or chain is anchored, in a way that the rising of the water level produces a rise of the housing which acts as a buoy or float, which causes the lower axle to turn, transmitting the movement to the inside of the housing, at the same time as the axle of the upper part turning by means of mechanical transmission and producing the rise and fall of the weight inside the chamber. The vertical movement of the weight inside the air chamber is harnessed to produce electrical energy, transforming the potential energy acquired in the rise of the counterweight. The energy acquired in the rise of the counterweight is transformed in the fall, causing the axle of the electric generator to turn, producing electrical energy.

The weight is suspended from the upper axle of the lower chamber through a taper-shaped collector or pulley.

An intermediate chamber, which is an air-water chamber. The function of this chamber is to fill or empty itself partially or completely with air or water depending on the moment of rise or fall of the level of water in which it is found. The chamber is partially open at the bottom, by various holes in the perimeter of the chamber that allow for the entrance and exit of water into and out of the chamber. In turn, the chamber is open at the top by a hole to allow the entrance and exit of air into and out of the chamber, which induces the entrance and exit of water into and out of the chamber by means of the lower holes.

The pressurised air for removing the water from the chamber is generated by a compressor, mechanically actuated by an electric motor or by a mechanical transmission connecting the upper axle of the lower chamber and the axle of the air compressor, transmitting the force from the upper axle of the lower chamber to the axle of the air compressor.

When the float or buoy, which the set of elements in the housing constitutes, ascends due to the increase in exterior water level (rise of level) the air is injected into the intermediate chamber. When the float descends, the air is expelled through another opening located in the top part of the chamber or through another opening also located in the top part of the chamber, passing through an air turbine with its own electric generator.

And an upper chamber which is also an air chamber. It is a chamber wherein the air compressor is located, which injects the compressed air into the intermediate chamber. Also in this chamber will be the turbine which can harness the energy available in the evacuation of air.

The length of this chamber is variable depending on the total length of the float and of other design parameters.

The anchoring cable has a ball joint and centering guide to enable the turning of the float and prevent the cable from twisting.

Lastly, it must be noted that the collector of said cable is located inside a chamber of artificial air which is generated in the bottom part of the float, which enables collector and its axle to not be in contact with the sea water.

Therefore the described device for generating electric energy by harnessing the energy of waves represents an innovation of structural and constitutive characteristics unknown so far to this end, reasons which in combination with its practical utility, provide it with enough basis to obtain the exclusivity privilege which is applied for

DESCRIPTION OF THE DRAWINGS

In order to complement the description that is being represented, and with the purpose of aiding to a better understanding of the characteristics of the invention, the present descriptive specification is enclosed with a set of drawings, forming integral part of the same, and wherein, with exemplary and non-limitative character, the following have been represented.

PREFERRED EMBODIMENT OF THE INVENTION

Figure 1:
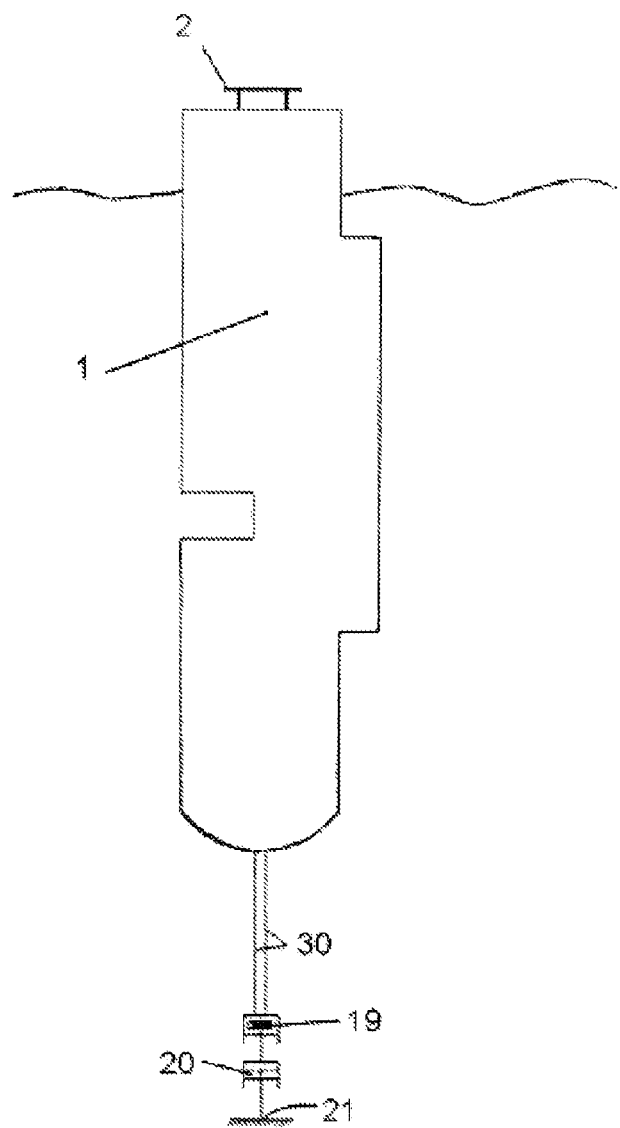
FIG. 1.—Shows a schematic elevational view of an example of the device for generating electrical energy by harnessing the energy of waves, object of the invention, wherein its general external configuration can be observed.
Figure 2:
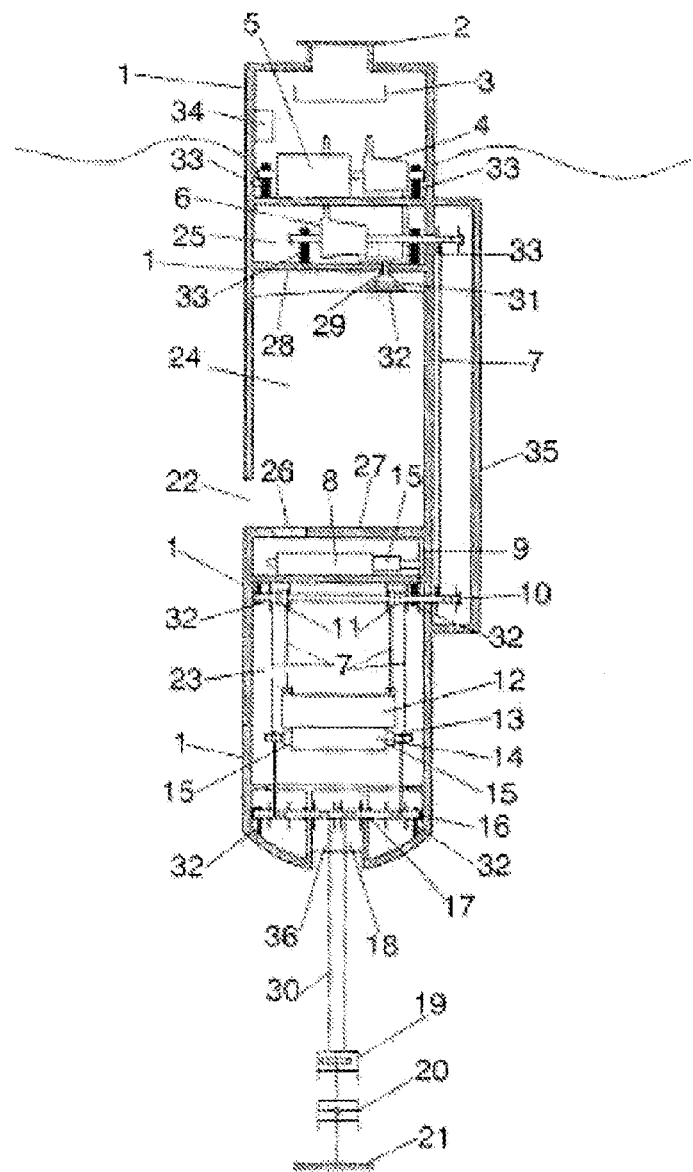
FIG. 2.—Shows a cross-section, according to a vertical cut, of the example of the device according to the invention, shown in the preceding figure, wherein the main parts and elements that comprise it as well as its configuration and arrangement can be observed.

In light of the previously mentioned figures, and according to the numeration adopted, therein an example of a preferred embodiment of the invention can be observed, which comprises the parts and elements which are indicated and described in more detail below, which have been referenced in the figures with the following numbers:

1. Enveloping housing
2. Upper chamber access door
3. Siphon
4. Turbine
5. Turbine generator
6. Compressor
7. Mechanical transmission chain
8. Upper generator
9. Pinions
10. Upper axle
11. Tapered collector
12. Weight
13. Spiral pulley
14. Lower generator
15. Turning rectifier
16. Lower axle
17. Gasket
18. Cable collector
19. Centering guide
20. Ball joint
21. Anchoring point
22. Water inlet/outlet
23. Lower chamber
24. Intermediate chamber
25. Upper chamber
26. Lower chamber access door
27. Lower chamber cap
28. Upper chamber cap
29. Air outlet hole
30. Anchoring cable
31. Return valve
32. Valve float
33. Bearings
34. Voltage/frequency conditioning device
35. Tube
36. Artificial air chamber Therefore, as observed in said figures, the device in question shows a configuration based on an enveloping housing (1) which, configured as a cylindrical float, is divided into various chambers.

One, lower (23), occupied, mainly, by a high tonnage weight (12), and one or two generators, one upper (8) and one lower (14), depending on the area of placement of the system for maximum harnessing of energy. This lower chamber (23), furthermore, has one access door referenced with (26), for maintenance and tuning.

The second chamber, which we shall call intermediate chamber (24), is located in the central part of the enveloping housing (1), and is inferiorly separated from the lower chamber (23) by means of a cap, referenced as lower chamber cap (27), to which the aforementioned access door to the lower chamber (26) is incorporated, and superiorly separated from a third upper chamber (25) by another cap, in this case referenced as (28), as well as a hole which enables the entrance and exit of air (29) provided in said cap. This intermediate chamber (24), furthermore, also has in the bottom thereof, some holes that enable the entrance and exit of water (22) inside the chamber. The intermediate chamber (24) contains water or air, in variable proportions defined depending on the situation of the wave, from trough to crest and vice versa, as will be explained later.

The third chamber or upper chamber (25) is located in the upper part of the enveloping housing (1) and is separated from the intermediate chamber (24) by the upper chamber cap (28), wherein the previously mentioned hole for the entrance and exit of air (29) is located.

Furthermore, in said upper chamber (25) there is a compressor (6) and a turbine (4) which are connected to the exterior by means of an access door to the upper chamber (2), which, during the normal operating of the system is open, and is only closed when the system is submerged to pass a storm.

This upper chamber (25) is divided into various compartments. In one compartment is the compressor (6), which compresses air from the interior of the upper chamber (25) and it expels it compressed to the intermediate chamber (24). In another compartment of the chamber (25), is the turbine (4) and a third generator, connected to said turbine and referenced with (5), and which harness the compressed air of the intermediate chamber (24) to generate electricity.

Depending on the overall location in which the device is placed, the upper chamber (25) can also house a voltage transformer which raises the output voltage of the generator or generators to the required voltage. This upper chamber (25) contains a siphon (3) at the inlet which retains the water that could enter through the access door (2) in said upper chamber and prevents it from reaching the compressor (6), turbine (4) or turbine generator (5).

Furthermore, the weight (12) of the lower chamber is suspended by a chain (7) from an upper axle (10), which has tapered ends (11) to act as a collector.

This upper axle (10), is mechanically connected by said chain (7) to a lower axle (16) also in the lower chamber (23) as well as to the compressor (6) located in the upper chamber (25). Said lower axle (16), has some gaskets (17) en the central part thereof which enable maintaining the chamber water-tight.

The chain (7), which mechanically connects the upper axle (10) and the compressor (6) has a closed air tube (35) inside it, next to the enveloping housing (1), which maintains all of the air transmission, and thus, with optimum lubrication.

In the central part of the lower axle (16) there are some chain collectors (18) that convert the vertical movement of the assembly that forms the enveloping housing with the elements it incorporates inside it, and it acts as a float in a turning rotational movement of the lower axle (16).

These collectors (18) are located inside an artificial air chamber (36) which minimises the corrosive effects of the sea water and enables the lower axle (16) and all the mechanisms it carries, to be in conditions of optimum lubrication. Furthermore, in said collectors (18) there are anchoring cables (30) rolled up which are held on their other end at the bottom of the sea at an anchoring point (21).

In the lowest part, close to said anchoring point (21), of these cables (30), a centering guide (19) and a ball joint (20) is foreseen, which allow the entire upper assembly to turn without producing a twist in the anchoring cable or chain (30).

It must be noted that the air outlet and inlet hole (29) of the intermediate chamber (24) has a return valve (31), actuated by a float (32), which prevents the water from managing to enter into the turbine (4) and/or the compressor (6).

In addition, the actuation of the upper generator (8) is operated by means of some pinions (9) of transmission between said upper axle (10) and a turning rectifier (15), which converts the oscillatory movements into movement of one single turning direction.

The actuation of the lower generator (14) is operated by means of a spiral shaped pulley (13) or by means of a tapered collector, i.e. tapered ends (11) of the axle (10), and the turning rectifier (15) that converts the upwards and downwards movement of the weight into one single turning direction.

Said spiral shaped pulley (13) acts as a rack and pinion system, i.e. the upwards and downwards movement is translated into a rotation movement of the pulley (13).

Both the upper axle (10) as well as the lower axle (16), are supported on some bearings (33) arranged in different points thereof that allow its rotation, minimizing friction.

Due to the oscillations of the device that cannot be controlled, the generation of energy in the generators will not have an industrial voltage and frequency, hence, the upper chamber (25) has a voltage and frequency conditioning device (34), comprised by a rectifier and, depending on the operating conditions of the device (together or alone), may have some stabilisers and power inverters that will provide an industrial voltage and frequency output of the system.

In light of the above, the operation of the system is as follows:

Its operation of the system is as follows:

The enveloping housing (1), on account of being submerged in a fluid, sea water, experiences a thrust equal to the weight of the volume of the removed fluid. Without waves, this thrust that the sea water exerts on the enveloping housing, counteracts with the weight that is ballasted on the seabed and the other elements that are inside thereof, in a way that the enveloping housing, exteriorly, acts as a float on the surface of the water.

When waves are produced, the entire assembly, acting as a float, oscillates in a way more or less similar to the undulatory movement that is produced in the sea.

When a rise of water level is produced, a rise of enveloping housing (1) is produced, to maintain the balance between the thrust on the housing and the weight thereof. When the enveloping housing rises, it causes the lower axle (16) to turn, transmitting the upward movement to the inside of the housing.

Said lower axle (16), in turn, causes the axle in the upper part (10) to turn by means of mechanical transmission, producing the more or less vertical rise of the weight (12) inside the chamber.

In turn, the turning of the upper axle (10), from which the weight (12) is suspended, will cause the compressor (6) to turn. This turning produces a compression of air that is inserted into the intermediate chamber (24), removing water through the water outlet holes (22) of the chamber to the sea.

This removal of water of the intermediate chamber (24), produces an increase of overall thrust of the system. As the weight of the system remains constant, this increase of thrust produces an additional movement of the enveloping housing (1), to attempt to achieve the situation of balance once more between the thrust that the housing experiences and the weight contained inside it.

At the same time as producing the turn of the upper axle (10), the force of the ballast that the weight (12) exerts on the seabed is greater, because as the axle turns, and the weight rises, the radius of the chain collector increases.

Furthermore, at the same time that the radius increases and the force of the ballast of the weight increases, the movement of the weight increases, in a way that at the beginning of the movement the weight displaces less length than at the end for the same movement of the enveloping housing.

When the water level descends, the opposite effect, approximately, is produced. When the level descends, the net thrust that is exerted on the housing (1) decreases. As the weight inside the housing is greater than the thrust that is exerted on the housing, the weight descends, until it more or less reaches the same situation that it had before the housing began to rise.

As the weight descends, harnessing the potential energy that the weight (12) has acquired, it causes the axle of the generator (14) to turn and produce energy. Depending on the wave conditions, it causes said weight generator (14) or upper axle generator (8) or both to operate.

Generally, during the period of rising, the generators will be electrically disconnected in a way that they extract energy during the descent period and achieve the weight to rise as high as possible during the rise period. In the event that the generators do not operate during the rise period, they act as a dead mass, but depending on the wave conditions, they can operate harnessing the energy that the weight has.

In addition, at the same time as the enveloping housing descends, the compressed air in the intermediate chamber is extracted, reducing the overall thrust of the housing and favouring the descent of the weight. Depending on the wave conditions, a harnessing of the energy of that compressed air can be reached, by causing that compressed air to exit through a turbine (4), which in turn, is connected to another generator (5). The movement is repeated according to the undulatory movement of the sea.

Therefore, as a summary, the proposed device is configured based on a float constituted by an enveloping housing (1) divided into two or more chambers, comprising, at least, one air chamber, containing an upper generator (8) and another lower one (14), a high tonnage weight (12) which is suspended from an upper axle (10) and is connected to a lower axle (16), whose central part of said lower axle (16) exits to the outside of the housing with an anchoring cable (30); and, in said air chamber or another different one, there is a compressor (6) and a turbine (4) connected to a third generator (5); and, at least, another chamber, with water inlet and outlet holes (22) to be filled or emptied, partially or completely, with air and water according to the moment of rising and falling of the water level, and open by an air outlet hole (29) to induce the output or input of water.

Having sufficiently described the nature of the present invention, as well as the way of putting it into practice, it is not considered necessary to further extend its description for any person skilled in the art to understand its scope and the advantages derived therefrom, stating that, within its essence, it can be put into practice in other embodiments which differ in detail from the one indicated by way of example, and which are also covered by the protection which is sought provided that its fundamental principle is not altered, changed or modified.

The invention claimed is:

1. Device for generating electrical energy by harnessing the energy of waves, comprising a float having an enveloping housing which is divided into two or more chambers, comprising:

At least one air chamber, containing an upper generator and a lower generator, a high tonnage weight, which is suspended from an upper axle and is connected to a lower axle, a central part of said lower axle exits to outside of the housing with an anchoring cable; and incorporating in said air chamber or another different air chamber, a compressor and a turbine connected to a third generator;

At least one chamber with water inlet and outlet holes to be filled or emptied, partially or completely, with air and water according to a moment of rising and falling of water level, and open by an air outlet hole to induce output or input of water.

2. Device for generating electrical energy by harnessing the energy of waves, according to claim 1, wherein the enveloping housing is divided into three chambers:

A lower air chamber, containing the upper generator and the lower generator below the high tonnage weight, suspended from the upper axle and which is mechanically connected by a transmission chain, to the lower axle, and the central part of said lower chain exits to the outside of the housing by water-tight gaskets;

An intermediate chamber, with water inlet and outlet holes in a lower perimeter, and open at a top by an air outlet to induce the output or input of water;

An upper air chamber comprising the compressor that generates pressurised air for removing water from the intermediate chamber, and the turbine connected to a third generator; wherein said compressor is mechanically actuated by an electric motor or by mechanical transmission by a chain connecting the upper axle of the lower chamber and an axle of the compressor.

3. Device for generating electrical energy by harnessing the energy of waves, according to claim 2, wherein the voltage and frequency conditioning device is housed in the upper chamber.

4. Device for generating electrical energy by harnessing the energy of waves, according to claim 2, wherein the upper chamber (25) contains a siphon that retains the water so that the water can enter through the access door (2) of said upper chamber.

5. Device for generating electrical energy by harnessing the energy of waves, according to claim 2, wherein the transmission chain, which puts the upper axle in mechanical communication with the compressor, is located inside a closed air tube which is next to the enveloping housing.

6. Device for generating electrical energy by harnessing the energy of waves, according to claim 1, wherein the upper axle from which the weight is suspended, has a configuration of tapered ends to act as a collector.

7. Device for generating electrical energy by harnessing the energy of waves, according to claim 1, wherein the lower axle contains a cable collector, which is located inside an artificial air chamber that is generated in the lower part of the enveloping housing, wherein the anchoring cable is rolled up.

8. Device for generating electrical energy by harnessing the energy of waves, according to claim 7, wherein the anchoring cable has a ball joint and a centering guide.

9. Device for generating electrical energy by harnessing the energy of waves, according to claim 1, wherein the device houses a voltage and frequency conditioning device.

10. Device for generating electrical energy by harnessing the energy of waves, according to claim 1, wherein the outlets and inlets of air of the intermediate chamber act as a return valve, actuated by a float.

* * * * *